United States Patent
Kurota

(10) Patent No.: US 11,818,516 B2
(45) Date of Patent: Nov. 14, 2023

(54) INFORMATION GENERATION METHOD USING PROJECTION IMAGE AND TAKEN IMAGE, INFORMATION GENERATION SYSTEM, AND NON-TRANSITORY COMPUTER-READABLE STORAGE MEDIUM STORING PROGRAM

(71) Applicant: SEIKO EPSON CORPORATION, Tokyo (JP)

(72) Inventor: Ippei Kurota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 49 days.

(21) Appl. No.: 17/470,760

(22) Filed: Sep. 9, 2021

(65) Prior Publication Data
US 2022/0078384 A1 Mar. 10, 2022

(30) Foreign Application Priority Data
Sep. 10, 2020 (JP) .................. 2020-151908

(51) Int. Cl.
*H04N 9/31* (2006.01)
*G06F 3/04883* (2022.01)

(52) U.S. Cl.
CPC ....... *H04N 9/3185* (2013.01); *G06F 3/04883* (2013.01); *H04N 9/3176* (2013.01); *H04N 9/3194* (2013.01)

(58) Field of Classification Search
CPC .. H04N 9/3185; H04N 9/3176; H04N 9/3194; G06F 3/04883; G01B 11/2504
See application file for complete search history.

(56) References Cited

U.S. PATENT DOCUMENTS

| | | | |
|---|---|---|---|
| 2016/0173840 A1 | 6/2016 | Kurakake | |
| 2017/0142382 A1* | 5/2017 | Nishioka | .............. H04N 9/3147 |
| 2018/0292867 A1 | 10/2018 | Specht et al. | |

FOREIGN PATENT DOCUMENTS

| | | |
|---|---|---|
| JP | 2005-195939 A | 7/2005 |
| JP | 2016-110545 A | 6/2016 |
| JP | 2017-123050 A | 7/2017 |
| JP | 2018-537884 A | 12/2018 |
| WO | 2017/119160 A1 | 7/2017 |

\* cited by examiner

*Primary Examiner* — Michael E Teitelbaum
*Assistant Examiner* — Humam M Satti
(74) *Attorney, Agent, or Firm* — Oliff PLC

(57) ABSTRACT

An information generation method including identifying a correspondence relationship between a projector coordinate system and a camera coordinate system, the correspondence relationship identified based on a first image and a second image, the first image projected on a projection target from a projector, and the second image obtained by imaging the projection target using a camera in a state in which the first image is projected on the projection target, displaying, by a display device, a taken image of the projection target which is taken by the camera, receiving a first operation which designates a display area in the camera coordinate system, and generating information for making the projector project a projection image in which a projection object is disposed in the display area designated by the first operation based on the correspondence relationship and information which representing the display area designated by the first operation.

10 Claims, 12 Drawing Sheets

FIG. 2

| DIGIT | FOR X COORDINATE | | FOR Y COORDINATE | |
|---|---|---|---|---|
| | POSITIVE PATTERN | NEGATIVE PATTERN | POSITIVE PATTERN | NEGATIVE PATTERN |
| (MSB) 6bit | | | | |
| 5bit | | | | |
| 4bit | | | | |
| 3bit | | | | |
| 2bit | | | | |
| 1bit | | | | |
| 0bit (LSB) | | | | |

INFORMATION GENERATION METHOD USING PROJECTION IMAGE AND TAKEN IMAGE, INFORMATION GENERATION SYSTEM, AND NON-TRANSITORY COMPUTER-READABLE STORAGE MEDIUM STORING PROGRAM

The present application is based on, and claims priority from JP Application Serial Number 2020-151908, filed Sep. 10, 2020, the disclosure of which is hereby incorporated by reference herein in its entirety.

BACKGROUND

1. Technical Field

The present disclosure relates to an information generation method, an information generation system, and a non-transitory computer-readable storage medium storing a program.

2. Related Art

In projection mapping, an expected advantage cannot be obtained unless the projection object is appropriately disposed in a projection image which is projected from a projector on a projection target such as a screen. In JP-A-2005-195939 (Document 1), there is disclosed a technology in which when an operation of designating a display area to be an arrangement destination of the projection object is performed on the screen, the operation is detected by sensing on the screen, and the display area is set in accordance with the operation thus detected.

In the technology disclosed in Document 1, there is a problem that a trouble occurs in designation of the display area when the projection target is installed in a high place beyond the reach of the user. Further, in the technology disclosed in Document 1, it is necessary to go to the installation location of the projection target to perform an operation of setting the display area every time the projection image is changed. When using the projection mapping for decorations in a store, it is common to change the projection image in accordance with an event such as Christmas, or the seasons. There is also a problem that it is cumbersome to go to the installation location of the projection target to perform the operation of setting the display area every time the projection image is changed.

SUMMARY

In view of the problems described above, an information generation method according to the present disclosure includes identifying a correspondence relationship between a projector coordinate system representing a position on a projection image projected by a projector and a camera coordinate system representing a position on a taken image taken by a camera, the correspondence relationship identified based on a first image and a second image, the first image projected on a projection target from the projector, and the second image obtained by imaging the projection target using the camera in a state in which the first image is projected on the projection target, displaying, by a display device, the taken image of the projection target which is taken by the camera, receiving a first operation which designates a display area in the camera coordinate system, and generating information for making the projector project the projection image in which a projection object is disposed in the display area designated by the first operation based on the correspondence relationship and information which representing the display area designated by the first operation and.

Further, in view of the problems described above, an information generation system according to the present disclosure includes an input device, a display device, and at least one processor which executes the steps of identifying a correspondence relationship between a projector coordinate system representing a position on a projection image projected by a projector and a camera coordinate system representing a position on a taken image taken by a camera, the correspondence relationship identified based on a first image and a second image, the first image projected on a projection target from the projector, and the second image obtained by imaging the projection target using the camera in a state in which the first image is projected on the projection target, making the display device display the taken image of the projection target which is taken by the camera, receiving input of a first operation to the input device, the first operation designating a display area in the camera coordinate system, and generating information for making the projector project the projection image in which a projection object is disposed in the display area designated by the first operation based on the correspondence relationship and information which representing the display area designated by the first operation.

Further, in view of the problems described above, a non-transitory computer-readable storage medium according to the present disclosure stores a program for making a computer execute a method including the steps of identifying a correspondence relationship between a projector coordinate system representing a position on a projection image projected by a projector and a camera coordinate system representing a position on a taken image taken by a camera, the correspondence relationship identified based on a first image and a second image, the first image projected on a projection target from the projector, and the second image obtained by imaging the projection target using the camera in a state in which the first image is projected on the projection target, making a display device display the taken image of the projection target which is taken by the camera, receiving a first operation which designates a display area in the camera coordinate system, and generating information for making the projector project the projection image in which a projection object is disposed in the display area designated by the first operation based on the correspondence relationship and information which representing the display area designated by the first operation.

BRIEF DESCRIPTION OF THE DRAWINGS

FIG. 2 is a diagram showing an example of measurement patterns in the embodiment.

DESCRIPTION OF EXEMPLARY EMBODIMENTS

Some embodiments of the present disclosure will hereinafter be described with reference to the drawings. The embodiments described hereinafter are provided with a variety of technically preferable limitations. However, the embodiments of the present disclosure are not limited to the aspects described below.

1. First Embodiment

Figure 1:
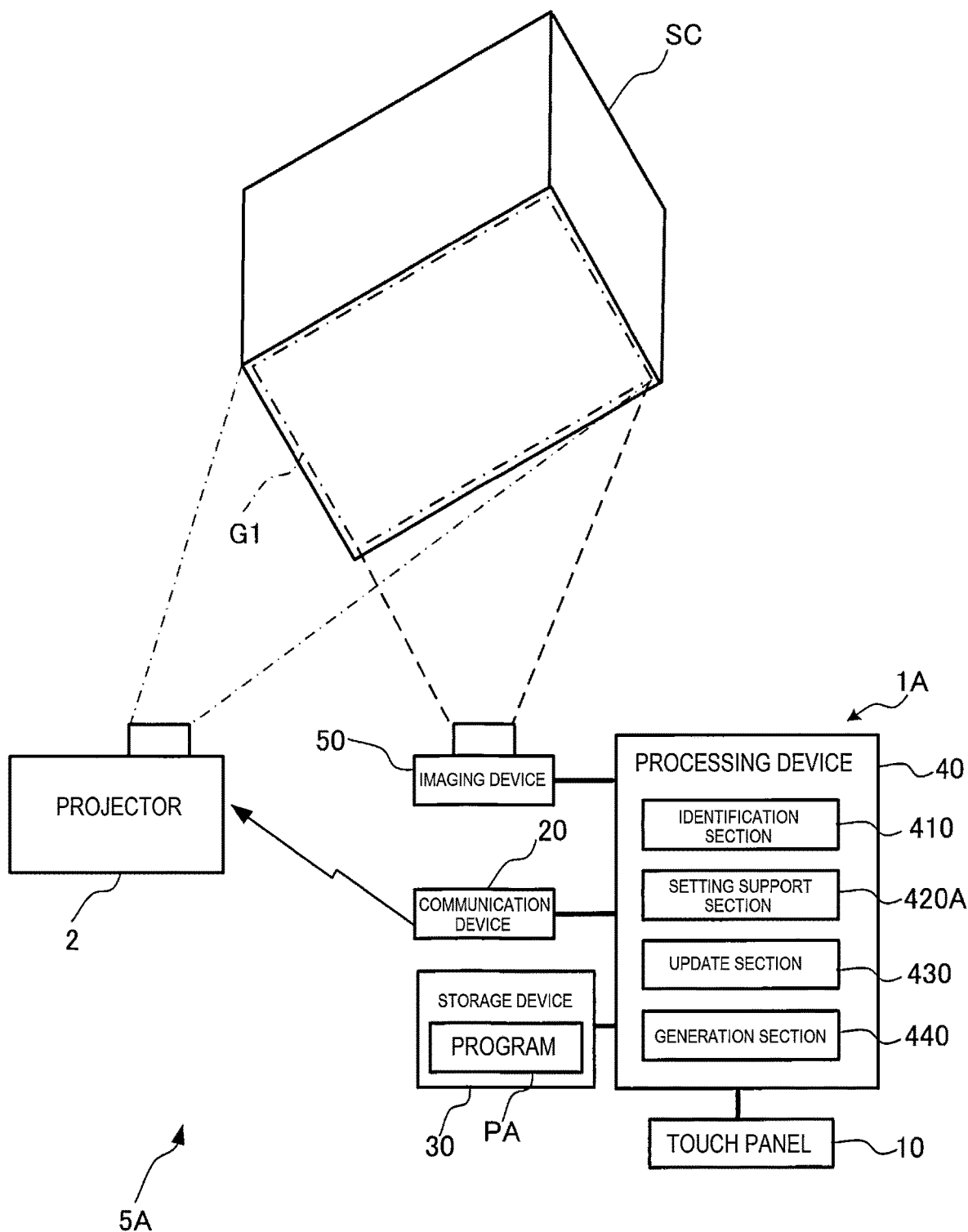
FIG. 1 is a block diagram showing a configuration example of an image display system including an information generation device for executing an information generation method according to a first embodiment of the present disclosure.

FIG. 1 is a block diagram showing a configuration example of an image display system 5A including an information generation device 1A for executing an information generation method according to a first embodiment of the present disclosure. In the image display system 5A, there is included a projector 2 which communicates with the information generation device 1A besides the information generation device 1A. The projector 2 projects a projection image G1 corresponding to image data supplied from the information generation device 1A on a surface of a projection target SC. In FIG. 1, although the detailed illustration is omitted, the projector 2 is provided with a light source, three display panels as a light modulation device, a projection lens, and a display panel drive section. The three display panels respectively correspond to colors of red, green, and blue. In the present embodiment, the display panels are each a liquid crystal light valve. The display panel drive section controls the transmittance of the light in each of the three display panels described above in accordance with the image data supplied from the information generation device 1A. The projector 2 modulates the light emitted from the light source with the three display panels to form image light, and then projects the image light from the projection lens to thereby display the projection image on the surface of the projection target SC. A shape of the projection target SC in the present embodiment is a rectangular solid body as shown in FIG. 1, but can be a three-dimensional shape constituted by polygons coupled to each other such as a triangular pyramidal shape or a quadrangular pyramidal shape, or a three-dimensional shape having a curved surface.

The information generation device 1A is, for example, a smartphone. The information generation device 1A has an imaging function, and a communication function of communicating with the projector 2. The information generation device 1A is not limited to the smartphone, but can also be, for example, a tablet terminal having the communication function and the imaging function. When the information generation device 1A and the projector 2 are network-connected to each other, the information generation device 1A communicates with the projector 2 to obtain projector information from the projector 2. In the projector information, there are included resolution information and compression format information representing a compression format which the projector 2 is capable of decompressing. The resolution information is information representing resolution of the display panel in the projector 2. The resolution information is used when generating a measurement pattern for measuring a position of the projection image to be projected on the projection target SC by the projector 2. Although the detail will be described later, in the present embodiment, a binary code pattern is used as the measurement pattern. The compression format information is used for the determination of the compression format of measurement pattern data when compressing the measurement pattern data representing the measurement pattern to transmit the result from the information generation device 1A to the projector 2. It is desirable for the compression format used when compressing the measurement pattern data to transmit the result from the information generation device 1A to the projector 2 to be a lossless compression format such as run-length, LZH, PNG, or GIF.

The information generation device 1A generates the measurement pattern data representing each of the plurality of measurement patterns using the resolution information obtained from the projector 2, and then provides the measurement pattern data thus generated to the projector 2. The projector 2 projects respective images of the plurality of measurement patterns represented by the measurement pattern data provided from the information generation device 1A on the projection target SC. It should be noted that it is possible for the projector 2 to generate the measurement pattern data based on a command which is transmitted from the information generation device 1A to the projector 2, and in this case, there is no need to include the compression format information in the projector information. According to the aspect in which the measurement pattern data is generated in the projector 2, the communication time for transmitting the measurement patterns from the information generation device 1A to the projector 2 is reduced. The information generation device LA prompts the user to take an image of the projection target SC in the state in which the image of the measurement pattern is projected thereon for each of the measurement patterns. The information generation device 1A takes an image of the projection target SC in the state in which the image of the measurement pattern is projected thereon using an imaging function in accordance with an operation by the user.

The information generation device 1A identifies the correspondence relationship between a projector coordinate system and a camera coordinate system based on the taken image of the projection target SC in the state in which the image of the measurement pattern is projected thereon, and the image of the measurement pattern. The projector coordinate system means a coordinate system representing a position on the projection image by the projector 2. As an example of the projector coordinate system, there can be cited a two-dimensional coordinate system taking an upper left corner of the projection image as an origin. The camera coordinate system means a coordinate system representing a position on the taken image. As a specific example of the camera coordinate system, there can be cited a two-dimensional coordinate system taking an upper left corner of the taken image as an origin.

Identifying the correspondence relationship between the projector coordinate system and the camera coordinate system means generating a transformation matrix for projective transformation from one coordinate system to the other coordinate system. In the present embodiment, the information generation device 1A generates the transformation matrix of transforming a coordinate in the camera coordinate system into a coordinate in the projector coordinate system.

As shown in FIG. 1, the information generation device 1A includes a touch panel 10, a communication device 20, a storage device 30, a processing device 40, and an imaging device 50. The communication device 20 is a wireless communication module or a wired communication module. When the communication device 20 is the wired communication module, the communication device 20 is connected to the projector 2 via a communication line. The connection between the information generation device 1A and the projector 2 can be a direct connection without intervention of a relay device such as a wireless access point device or a router, or can also be an indirect connection via the relay device. When the communication device 20 is the wireless communication module, an ad-hoc connection can be cited as a specific example of the direct connection, and an access-point connection via a wireless access point device can be cited as a specific example of the indirect connection. Further, when the communication device 20 is the wired communication module, a peer-to-peer connection can be cited as a specific example of the direct connection, and a connection via a wired router or a wired hub can be cited as a specific example of the indirect connection. The communication device 20 communicates with the projector 2 under the control by the processing device 40. The imaging device 50 is a camera. The imaging device 50 takes an image under the control by the processing device 40, and supplies image data representing the taken image to the processing device 40.

The touch panel 10 is a device in which a display device for displaying an image and an input device to which information by a user is input are integrated with each other. The input device is, for example, a contact sensor like a transparent sheet. The input device is disposed so as to cover a display surface of the display device. The input device detects a touch position using a capacitance identified by an object which makes contact with the input device and the input device, and then outputs data representing the touch position thus detected to the processing device 40. Thus, the operation content of the user to the touch panel 10 is transmitted to the processing device 40.

The storage device 30 is a recording medium which can be read by the processing device 40. The storage device 30 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory).

In the nonvolatile memory of the storage device 30, there is stored a program PA to be executed by the processing device 40. The volatile memory in the storage device 30 is used by the processing device 40 as a work area when executing the program PA. The program PA can be referred to as an □application program,□ □application software,□ or an □app.□ The program PA is obtained from, for example, a server not shown via the communication device 20, and is then stored in the storage device 30. The program PA can be stored in advance in the storage device 30.

The processing device 40 is configured including a processor such as a CPU (Central Processing Unit). The processing device 40 can be formed of a single processor, or can also be formed of a plurality of processors. Taking the fact that the operation instructing the start of the execution of the program PA is made on the touch panel 10 as a trigger, the processing device 40 retrieves the program PA from the nonvolatile memory to the volatile memory, and then starts the execution of the program PA. The processing device 40 which is currently operating in accordance with the program PA functions as an identification section 410, a setting support section 420A, an update section 430, and a generation section 440. The identification section 410, the setting support section 420A, the update section 430, and the generation section 440 shown in FIG. 1 are each a software module realized by operating the processing device 40 in accordance with the program PA.

The identification section 410 identifies the correspondence relationship between the projector coordinate system and the camera coordinate system based on the image of the measurement pattern projected from the projector 2, and the taken image obtained by imaging the projection target SC in the state in which the image of the measurement pattern is projected thereon using the imaging device 50. The image of the measurement pattern to be projected from the projector 2 is an example of a first image in the present disclosure. The taken image obtained by imaging the projection target SC in the state in which the image of the measurement pattern is projected thereon using the imaging device 50 is an example of a second image in the present disclosure.

In the more detailed description, taking the fact that the start of the identification is instructed by an operation to the touch panel 10 under the situation in which the information generation device 1A and the projector 2 are network-connected to each other as a trigger, the identification section 410 obtains the projector information. Subsequently, the identification section 410 generates the measurement pattern data from the resolution information included in the projector information. The identification section 410 controls the projector 2 so as to sequentially project the plurality of measurement patterns represented by the measurement pattern data. Further, the identification section 410 prompts the user to take an image of each of the plurality of measurement patterns sequentially projected on the projection target SC, and makes the imaging device 50 perform imaging in accordance with an operation of the user. Then, the identification section 410 identifies the correspondence relationship between the projector coordinate system and the camera coordinate system based on the images of the plurality of measurement patterns and the plurality of taken images taken by the imaging device 50.

More particularly, the identification section 410 generates the transformation matrix for performing the projective transformation of the coordinates of the measurement pattern in the taken image taken by the imaging device 50 into the coordinates of the measurement pattern in the display device of the projector 2 based on the images of the plurality of measurement patterns and the plurality of taken images. The transformation matrix is also used when performing deformation for realizing a geometric correction of the projection image to be projected on the projection target SC. In the present embodiment, when projecting the projection image from the projector 2, the image data of the projection image including the projection object on which the geometric correction has been performed using the transformation matrix described above is provided from the information generation device 1A to the projector 2, and the projector 2 projects the image in accordance with the image data.

As described above, in the present embodiment, the binary code pattern is used as the measurement pattern. The binary code pattern means an image for expressing the coordinate of the display device using a binary code. The binary code is a technique of expressing a value of each of the digits when expressing an arbitrary numerical value with a binary number using ON/OFF of a switch. When using the binary code pattern as the measurement pattern, an image to be projected by the projector 2 corresponds to the switch described above, and a corresponding number of images to the number of digits of the binary number representing the coordinate value becomes necessary. Further, separate images are required respectively for the X coordinate and the Y coordinate. For example, when the resolution of the display panel of the projector 2 is 120×90, since 120 and 90 are each expressed by a binary number in seven digits, seven images become necessary for expressing the X coordinate, and seven images become necessary for expressing the Y coordinate.

Further, it is generally known that when using the binary code pattern as the measurement pattern, the robustness of the measurement deteriorates due to an influence of a disturbance light such as illumination. Therefore, when using the binary code pattern as the measurement pattern, it is common to additionally use a complementary pattern in order to suppress the influence of the disturbance light to increase the robustness of the measurement. The complementary pattern means an image obtained by flipping white and black. Hereinafter, the binary code pattern in which 1 is represented by white and 0 is represented by black is called a □positive pattern,□ and the complementary pattern in which the relationship is flipped is called a □negative pattern.□ In the present embodiment, when the resolution represented by the resolution information is 120×90, as shown in FIG. 2, the measurement pattern data representing 14 positive patterns and 14 negative patterns, 28 measurement patterns in total, is generated by the identification section 410. Although the binary code patterns are used as the measurement patterns in the present embodiment, there can be used other structured light such as dot patterns, rectangular patterns, polygonal patterns, checker patterns, gray code patterns, phase-shift patterns, or random dot patterns.

The setting support section 420A makes the display device of the touch panel 10 display a setting support screen in order to prompt the user to execute the first operation of designating a display area to be an arrangement destination of the projection object in the camera coordinate system. The setting support screen in the present embodiment is generated based on the taken image of the projection target SC by the imaging device 50. As the taken image to be a base of the setting support screen, it is possible to divert any of the plurality of second images. As a specific example of the first operation, there can be cited an operation of drawing an outline of the display area. The first operation in the present embodiment is an operation of drawing a trajectory corresponding to the outline of the display area by swiping the touch panel 10.

The setting support section 420A obtains the coordinate of a point on the trajectory drawn by the first operation at regular time intervals such as 1 millisecond, and arranges information representing each of the coordinates thus obtained and information representing the acquisition order so as to be associated with each other to thereby generate first area information representing a plurality of coordinates corresponding one-to-one to the plurality of points on the outline of the display area. As a specific example of the information representing the acquisition order, there can be cited IDs in which the later the order of the vertex is, the higher the value is. It should be noted that it is possible to generate the first area information using coordinates obtained by adding a predetermined offset to the coordinates of the points on the trajectory drawn by the first operation instead of the coordinates themselves. In the present embodiment, the display area is designated by drawing the trajectory corresponding to the outline of the display area using the swipe to the touch panel 10. However, it is also possible to designate the vertexes of the first display area in sequence so as to draw the outline of the display area by tapping the touch panel 10. The vertex means a place where the outline is folded. For example, when designating the display area having a rectangular shape, it is possible to cite an operation of tapping four vertexes of the rectangular shape in the order of a vertex on an upper left corner, a vertex on an upper right corner, a vertex on a lower right corner, and a vertex on a lower left corner.

Figure 3:
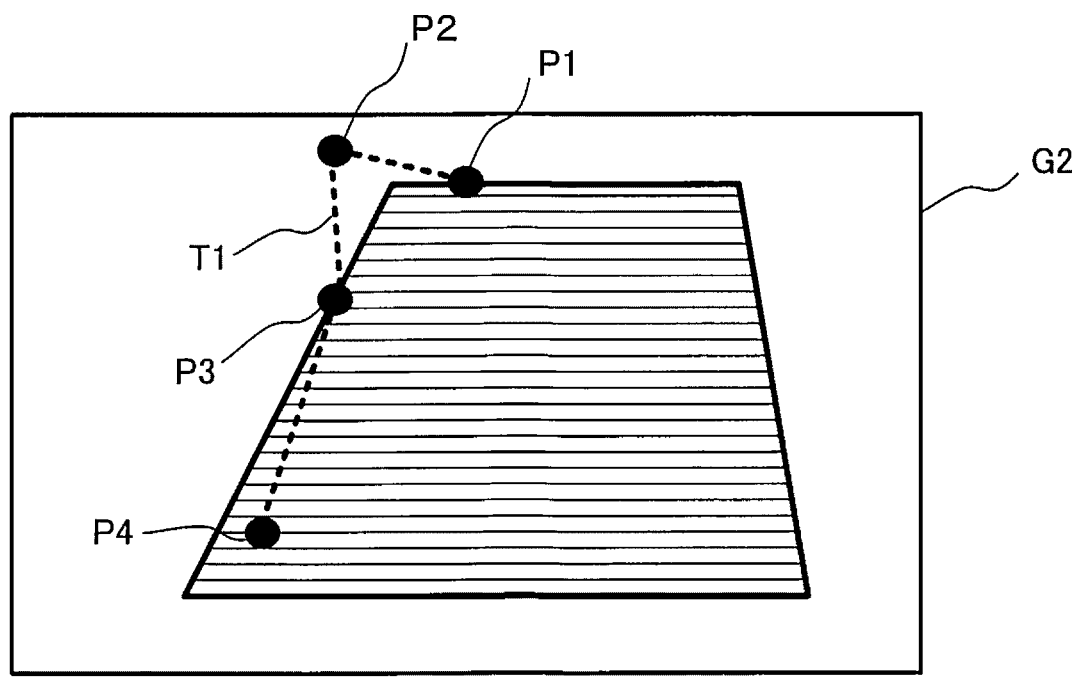
FIG. 3 is a diagram showing an example of an image which a processing device of the information generation device makes a display device display in order to prompt setting of a display area, and an example of a trajectory drawn by a first operation, and a plurality of points obtained along the trajectory.

FIG. 3 is a diagram showing an example of the setting support screen G2 which the setting support section 420A makes the display device display in order to prompt execution of the first operation, and the first operation performed on the setting support screen G2. An area provided with horizontal-line hatching in FIG. 3 is an area in which the correspondence relationship with the projector coordinate system has already been identified by the identification section 410. In FIG. 3, the trajectory T1 drawn by the first operation is illustrated with dotted lines. It should be noted that in FIG. 3, only apart of the trajectory T1 is illustrated in order to avoid complication of the drawing. In the first area information generated by the setting support section 420A, there are included information representing the coordinates in the camera coordinate system of the respective points P1, P2, P3, and P4 on the trajectory T1, and information representing the acquisition order of the points, namely the order of connecting the points with lines when making the outline of the display area.

Subsequently, the setting support section 420A judges presence or absence of the coordinate in the projection coordinate system which is made to correspond to each of the points represented by the first area information using the correspondence relationship identified by the identification section 410. Further, the setting support section 420A excludes the coordinate of the point which does not have the coordinate in the projector coordinate system corresponding thereto due to the correspondence relationship from the first area information. The reason that the coordinate which does not have the coordinate in the projector coordinate system corresponding thereto is excluded from the first area information is to make it possible to surely transform the display area represented by the first area information representing the coordinates of the plurality of points on the outline into the projector coordinate system.

Figure 4:
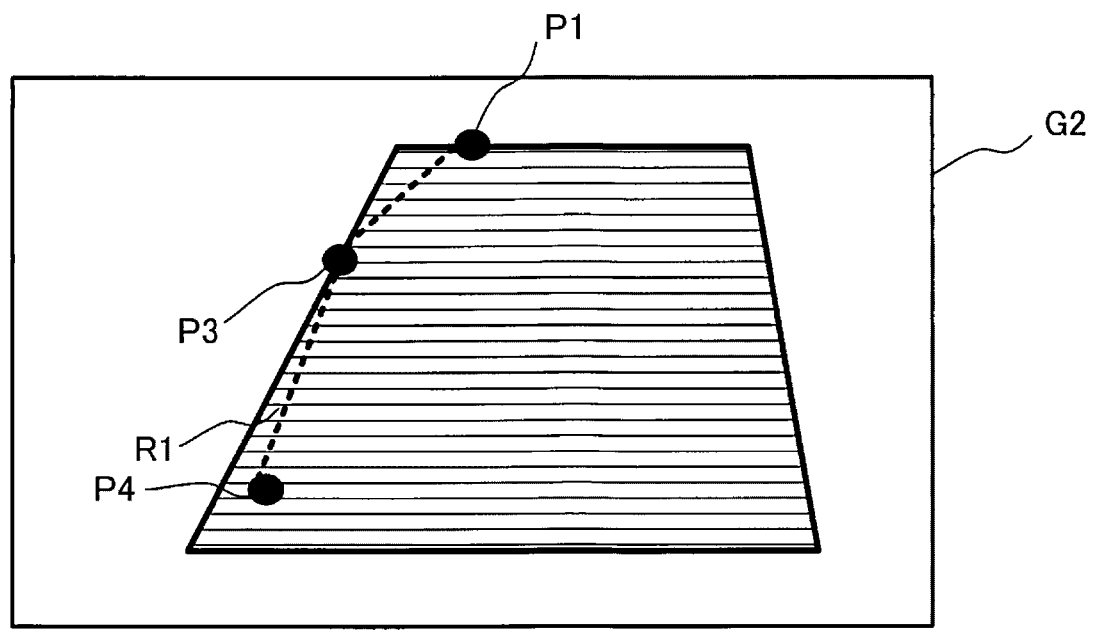
FIG. 4 is a diagram showing an example of the plurality of points represented by first area information which has been corrected by a setting support section.

In the example shown in FIG. 3, the point P2 out of the points P1, P2, P3, and P4 is located outside the area in which the correspondence relationship is identified by the identification section 410. In other words, the point P2 does not have the coordinate in the projector coordinate system corresponding thereto. Therefore, the setting support section 420A excludes the information related to the point P2 from the first area information to thereby correct the first area information. FIG. 4 is a diagram showing a line R1 as apart of the outline represented by the first area information having been corrected, and the points P1, P3, and P4 on the line R1.

When the second operation is performed by the user, the update section 430 updates the first area information in accordance with the second operation. The second operation is an operation of designating a point on the outline of the display area designated by the first operation, and then moving the point thus designated. By updating the first area information in accordance with the second operation, it becomes possible to set the display area having a complicated shape.

Figure 5:
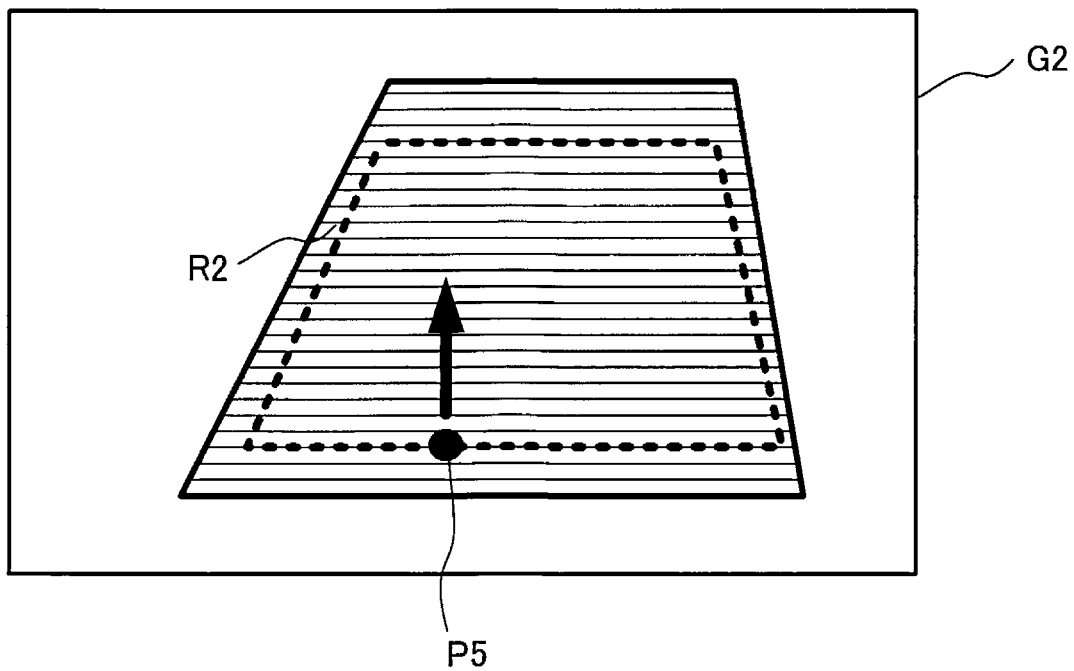
FIG. 5 is a diagram showing an example of a second operation.
Figure 6:
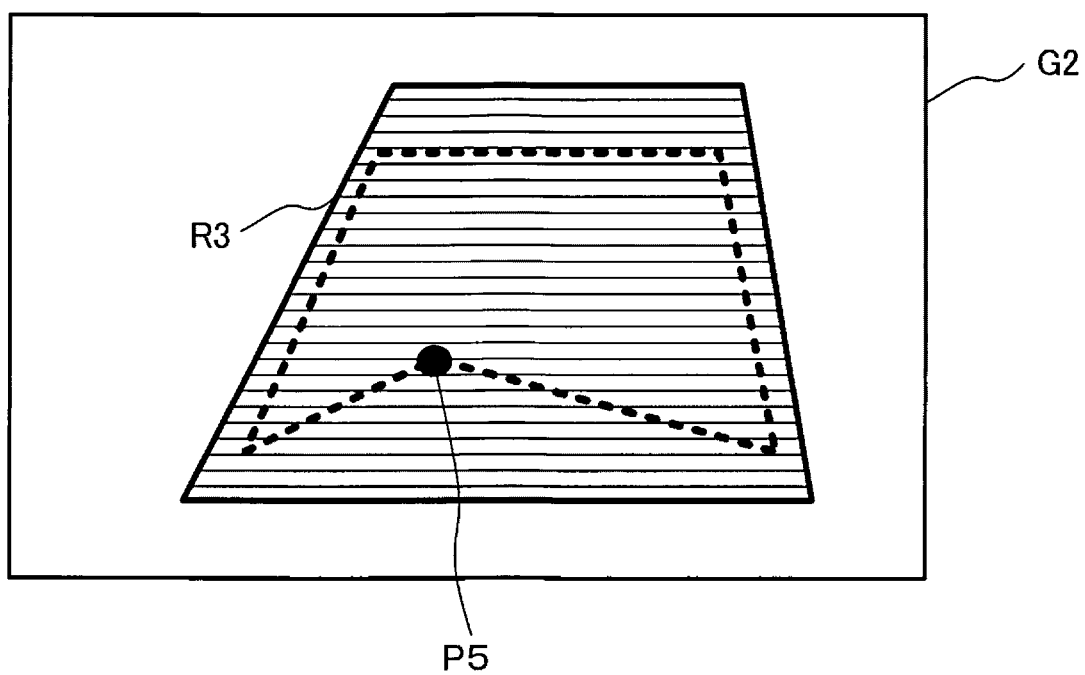
FIG. 6 is a diagram showing an example of an outline which has been updated by an update section.
Figure 7:
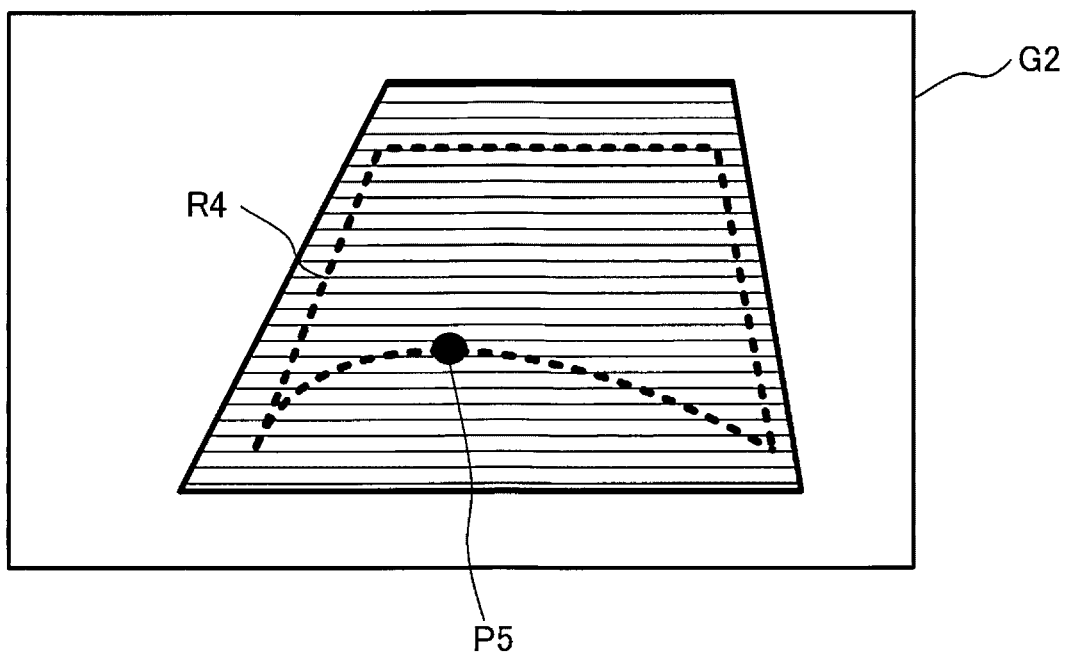
FIG. 7 is a diagram showing another example of the outline which has been updated by the update section.

For example, it is assumed that as shown in FIG. 5, a point P5 on the outline R2 designated by the first operation is designated to the setting support screen G2, and the second operation of moving the point P5 designated in the arrow direction in FIG. 5 is performed. In this case, the update section 430 updates the information representing the coordinate of the point P5 included in the first area information in accordance with the second operation. As a result, the first area information having been updated becomes information representing the outline R3 shown in FIG. 6. It should be noted that instead of updating only the coordinate of the point designated by the second operation, it is possible to update the first area information by changing the coordinates of the points located on the periphery of the point designated by the second operation in the outline designated by the first operation in the same direction as the direction in which the point is moved by the second operation while decreasing the amount of the change as the distance from the point designated by the second operation increases. In this case, the first area information having been updated becomes information representing the outline R4 shown in FIG. 7.

The generation section 440 generates information for making the projector 2 project the projection image in which the projection object is disposed in the display area where the coordinates of the plurality of points on the outline are represented by the first area information based on the first area information and the correspondence relationship identified by the identification section 410. In the more detailed description, the generation section 440 transforms the first area information into second area information representing coordinates of a plurality of points on the outline of the display area in the projector coordinate system using the transformation matrix identified by the identification section 410. The second area information is an example of the information for making the projector 2 project the projection image in which the projection object is disposed in the display area where the plurality of coordinates on the outline is represented by the first area information. This is because it is possible to make the projector 2 project the projection image in which the projection object is disposed in the display area designated by the first operation by setting the display are in accordance with the second area information, generating the image data of the projection image in which the projection object is disposed in the display area, and providing the image data to the projector 2.

Figure 8:
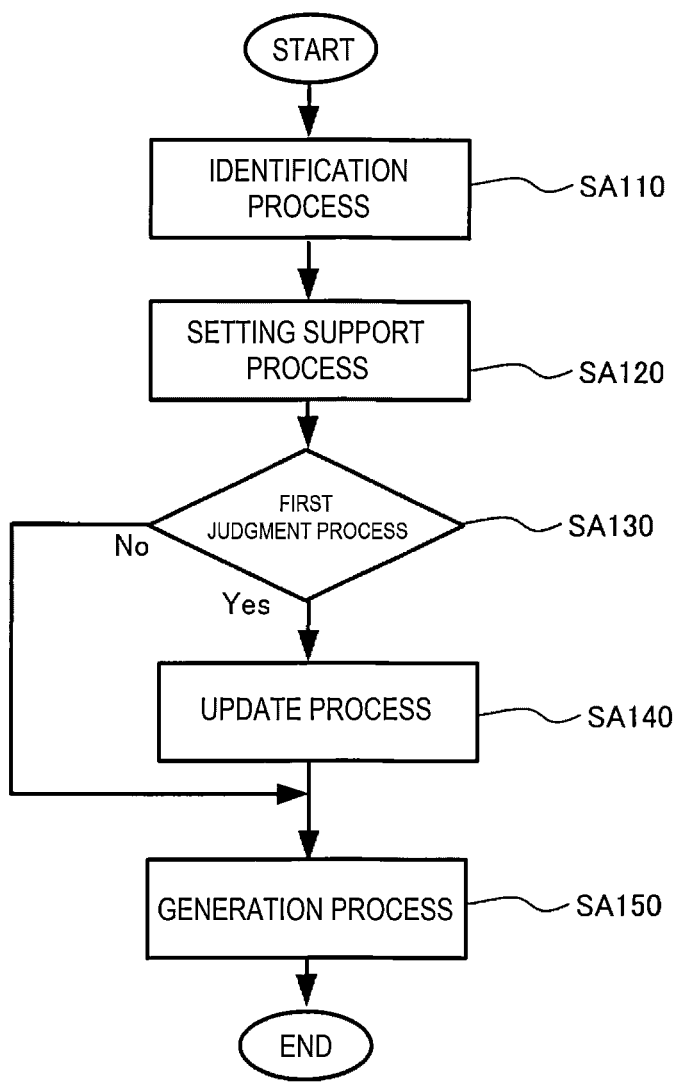
FIG. 8 is a flowchart showing a flow of an information generation method to be executed by the processing device of the information generation device in accordance with a program.

Further, the processing device 40 which is operating in accordance with the program PA executes an information generation method according to the present disclosure. FIG. 8 is a diagram showing a flow of the information generation method to be executed by the processing device 40 in accordance with the program PA. As shown in FIG. 8, the information generation method according to the present disclosure includes an identification process SA110, a setting support process SA120, a first judgment process SA130, an update process SA140, and a generation process SA150.

In the identification process SA110, the processing device 40 functions as the identification section 410. In the identification process SA110, taking the fact that the start of the identification is instructed by the user using the operation to the touch panel 10 as a trigger, the processing device 40 requests transmission of the projector information to the projector 2, and obtains the projector information sent back from the projector 2. Then, the processing device 40 generates the plurality of measurement patterns based on the resolution information included in the projector information obtained from the projector 2. The processing device 40 controls the projector 2 so as to sequentially project the plurality of measurement patterns represented by the measurement pattern data. Further, the processing device 40 prompts the user to take an image of each of the plurality of measurement patterns sequentially projected on the projection target SC, and makes the imaging device 50 perform imaging in accordance with an operation of the user to obtain the second image. Further, the processing device 40 generates the transformation matrix of transforming a coordinate in the camera coordinate system into a coordinate in the projector coordinate system based on the first image and the second image.

In the setting support process SA120 following the identification process SA110, the processing device 40 functions as the setting support section 420A. In the setting support process SA120, the processing device 40 makes the display device of the touch panel 10 display the setting support screen in order to prompt the user to execute the first operation. Then, the processing device 40 obtains the coordinates of the points on the trajectory drawn by the first operation at regular time intervals to generate the first area information. It should be noted that the processing device 40 excludes the coordinate of the point which does not have the coordinate in the projector coordinate system corresponding thereto out of the coordinates of the plurality of points represented by the first area information from the first area information to thereby correct the first area information.

In the first judgment process SA130 following the setting support process SA120, the processing device 40 judges whether or not the second operation has been performed using the operation to the touch panel 10. When the judgment result in the first judgment process SA130 is □No,□ the processing device 40 executes the generation process SA150. In contrast, when the judgment result in the first judgment process SA130 is □Yes,□ the processing device 40 executes the generation process SA150 after executing the update process SA140. In the update process SA140, the processing device 40 functions as the update section 430. The first area information is updated in accordance with the second operation.

In the generation process SA150, the processing device 40 functions as the generation section 440. In the generation process SA150, the processing device 40 transforms the first area information into the second area information using the transformation matrix generated in the identification process SA110.

According to the information generation device 1A related to the present embodiment, it becomes possible to set the display area using the operation to the taken image of the projection target SC. Therefore, when taking the image of the projection target SC once, it becomes possible to set the display area without going to the installation place of the projection target SC. Further, according to the information generation device 1A related to the present embodiment, it becomes possible to designate the display area without any problem even when the projection target SC is installed in a high place beyond the reach of the user. As described above, according to the information generation device 1A related to the present embodiment, it becomes possible to simply and easily set the display area without going to the installation place of the projection target SC every time the projection image is changed. In addition, according to the information generation device 1A related to the present embodiment, it becomes possible to surely set the display area which can be transformed into the projector coordinate system.

2. Second Embodiment

Figure 9:
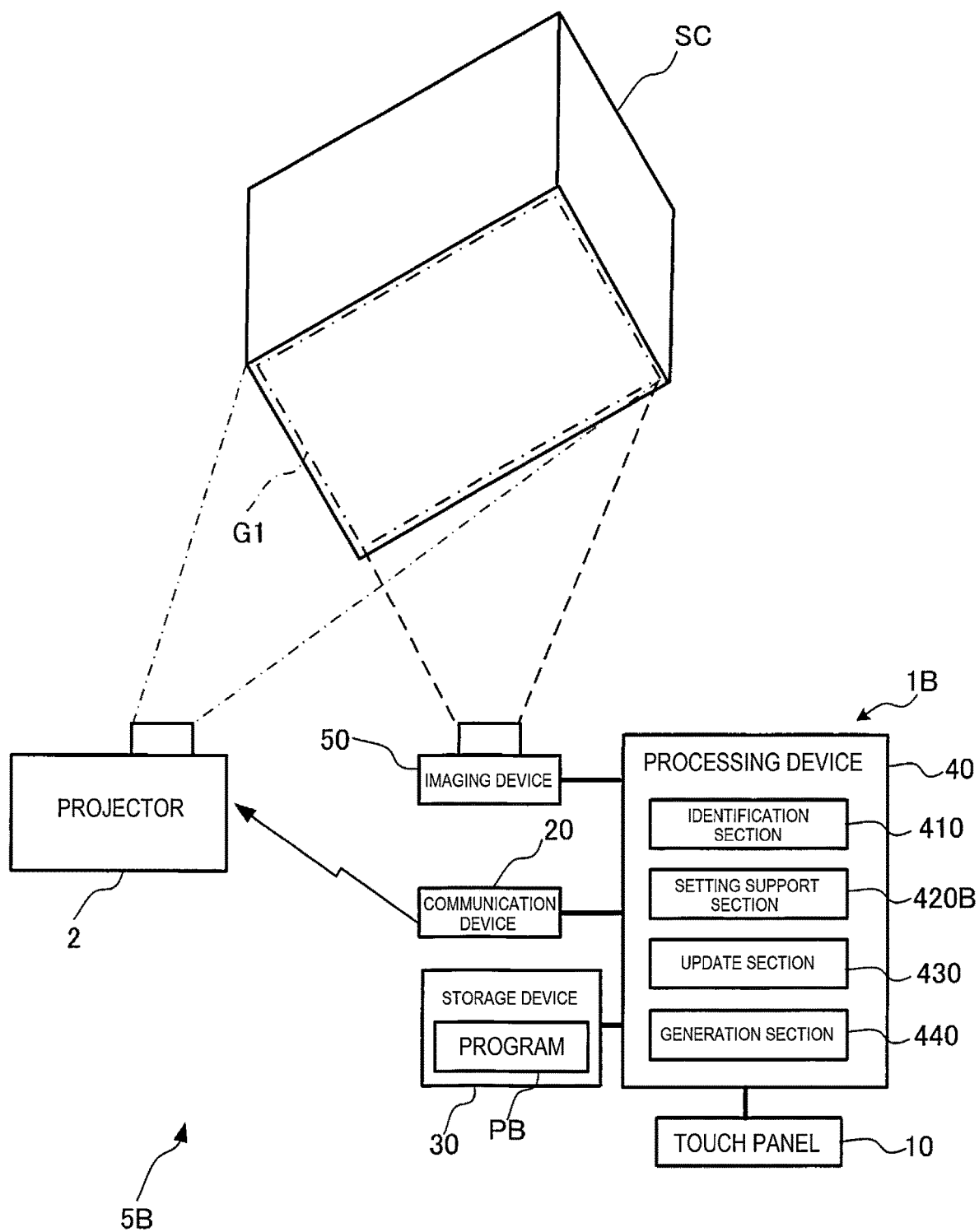
FIG. 9 is a block diagram showing a configuration example of an image display system including an information generation device for executing an information generation method according to a second embodiment of the present disclosure.

FIG. 9 is a block diagram showing a configuration example of an image display system 5B including an information generation device 1B for executing an information generation method according to a second embodiment of the present disclosure. In FIG. 9, the same constituents as those shown in FIG. 1 are denoted by the same reference symbols. As is obvious when comparing FIG. 9 and FIG. 1 with each other, a difference of the image display system 5B from the image display system 5A is that the information generation device 1B is provided instead of the information generation device 1A. A difference of the information generation device 1B from the information generation device 1A is that a program PB is stored in the storage device 30 instead of the program PA. The program PB is the same as the program PA in the point that the processing device 40 is made to function as the identification section 410, the update section 430, and the generation section 440. The program PB is different from the program PA in the point that the processing device 40 is made to function as a setting support section 420B instead of the setting support section 420A.

The setting support section 420B makes the display device of the touch panel 10 display the setting support screen generated based on the taken image of the projection target SC by the imaging device 50 in order to prompt the user to execute the first operation. The setting support section 420B is the same in this point as the setting support section 420A. Further, the setting support section 420B generates the first area information in accordance with the first operation. The setting support section 420B is the same also in this point as the setting support section 420A.

A difference of the setting support section 420B from the setting support section 420A is as follows. The setting support section 420B obtains outline information representing the outline of the projection target SC in the camera coordinate system. As a specific example of the outline information, there can be cited edge information which can be obtained by performing edge extraction on the taken image of the projection target SC. The edge information is information representing a coordinate of an edge in an image, and the edge means a pixel at which the luminance rapidly changes when sampling the luminance of the pixels in a horizontal scanning direction or a vertical scanning direction of the image. It is common that a pixel corresponding to the projection target SC and a pixel corresponding to a background of the projection target SC are different in luminance from each other in the taken image of the projection target SC. In other words, it is common that the outline of the projection target SC becomes the edge in the taken image of the projection target SC. Therefore, it is possible to use the edge information obtained from the taken image of the projection target SC as the outline information. It should be noted that the specific example of the outline information is not limited to the edge information obtained from the taken image of the projection target SC, but CAD (Computer Aided Design) information used when the projection target SC has been drawn with CAD can be used as the outline information.

Figure 10:
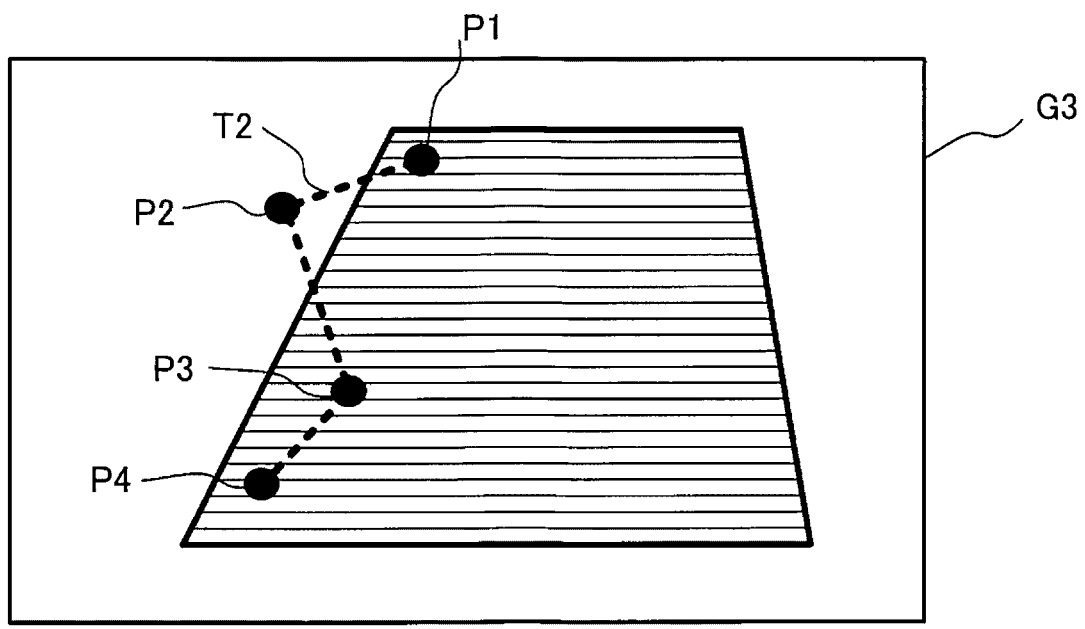
FIG. 10 is a diagram showing an example of an image which the processing device of the information generation device makes the display device display in order to prompt setting of the display area, and an example of the trajectory drawn by the first operation, and the plurality of points obtained along the trajectory.
Figure 11:
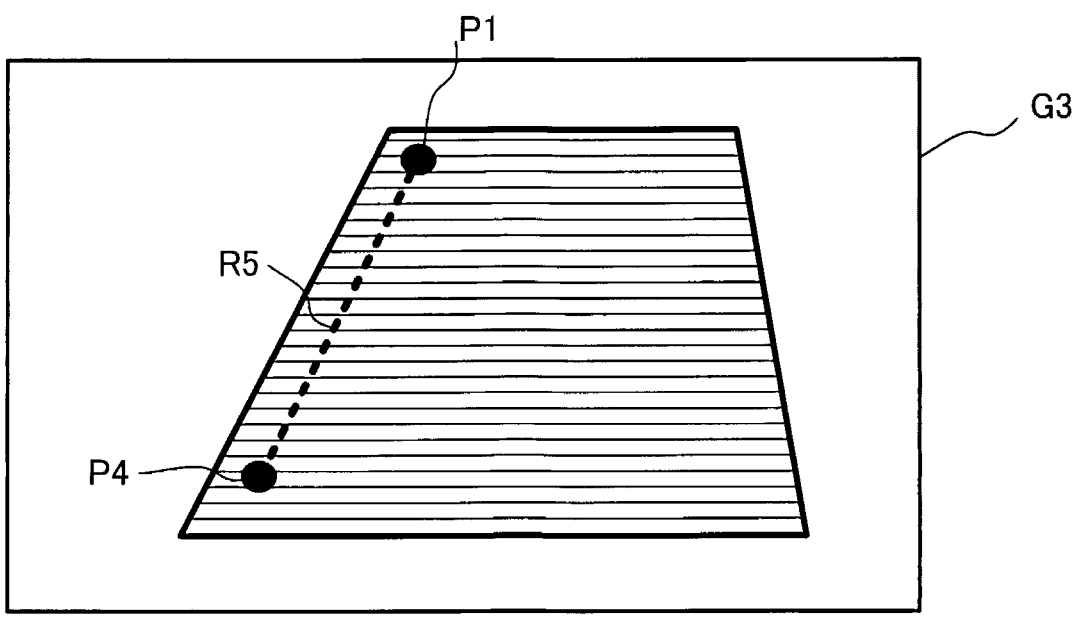
FIG. 11 is a diagram showing an example of the plurality of points represented by the first area information which has been corrected by a setting support section.

Then, the setting support section 420B judges whether or not a distance from the outline represented by the outline information is not shorter than a first threshold value with respect to each of the plurality of points represented by the first area information, and then excludes the coordinate of the point the judgment result of which is affirmative from the first area information to thereby correct the first area information. It should be noted that regarding the specific value of the first threshold value, it is sufficient to properly perform an experiment or the like to obtain a preferred value. For example, it is assumed that the trajectory T2 is drawn using the first operation to the setting support screen G3, and the coordinates of the points P1, P2, P3, and P4 are obtained at regular time intervals in this order as the coordinates of the points on the trajectory T2 as shown in FIG. 10. It should be noted that in FIG. 10, only a part of the trajectory T2 is illustrated. Further, it is assumed that regarding the points P2, P3, the distance from the outline of the projection target SC is not shorter than the first threshold value. In this case, the setting support section 420B excludes the information related to the points P2, P3 from the first area information to thereby correct the first area information. FIG. 11 is a diagram showing a line R5 as a part of the outline represented by the first area information having been corrected by the setting support section 420B, and the points P1, P4 on the line R5.

Figure 12:
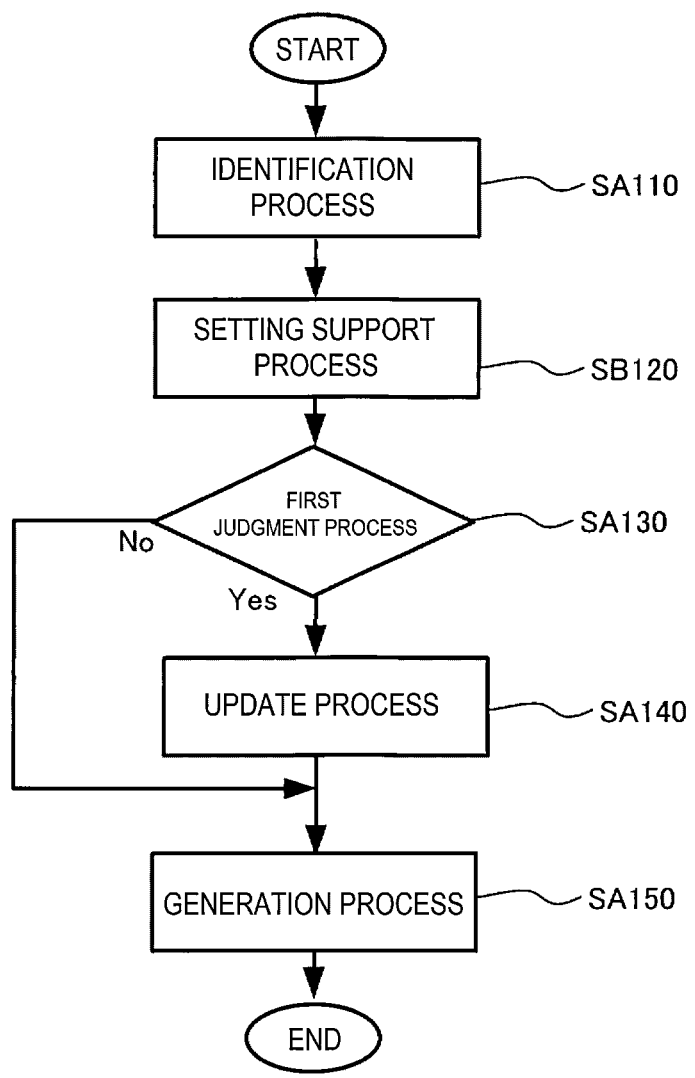
FIG. 12 is a flowchart showing a flow of an information generation method to be executed by the processing device of the information generation device in accordance with a program.

Further, the processing device 40 which is operating in accordance with the program PB executes the information generation method according to the present disclosure. FIG. 12 is a diagram showing a flow of the information generation method to be executed by the processing device 40 in accordance with the program PB. In FIG. 12, the same constituents as those shown in FIG. 8 are denoted by the same reference symbols. The information generation method according to the present embodiment is different from the information generation method according to the first embodiment in the point that a setting support process SB120 is provided instead of the setting support process SA120. In the setting support process SB120, the processing device 40 functions as the setting support section 420B. In the setting support process SB120, the processing device 40 makes the display device of the touch panel 10 display the setting support screen generated based on the taken image of the projection target SC by the imaging device 50 in order to prompt the user to execute the first operation. The processing device 40 obtains the coordinates of the points on the trajectory drawn by the first operation at regular time intervals to generate the first area information. Further, the processing device 40 obtains the outline information representing the outline of the projection target SC in the camera coordinate system. Then, the processing device 40 judges whether or not the distance from the outline represented by the outline information is not shorter than the first threshold value with respect to each of the plurality of points represented by the first area information, and then excludes the coordinate of the point the judgment result of which is affirmative from the first area information to thereby correct the first area information. The first area information which has been corrected represents an outline represented by the outline information, namely an outline approximating the outline of the projection target SC.

According also to the information generation device 1B related to the present embodiment, there is no need to go to the installation place of the projection target SC every time the projection image is changed. Further, according also to the information generation device 1B related to the present embodiment, it becomes possible to designate the display area without any problem even when the projection target SC is installed in a high place beyond the reach of the user. As described above, according also to the information generation device 1B related to the present embodiment, it becomes possible to simply and easily set the display area without going to the installation place of the projection target SC every time the projection image is changed. According to the information generation device 1B related to the present embodiment, it becomes possible to set the display area having the outline approximating the outline of the projection target SC.

The setting support section 420B in the present embodiment judges whether or not the distance from the outline represented by the outline information is not shorter than the first threshold value with respect to each of the plurality of points represented by the first area information, and then excludes the coordinate of the point the judgment result of which is affirmative from the first area information to thereby correct the first area information. However, it is possible to make the setting support section 420B perform the correction based on the correspondence relationship identified by the identification section 410 in parallel to the correction based on the outline information. Specifically, it is possible to make the setting support section 420B further perform the process of judging the presence or absence of the coordinate in the projector coordinate system made to correspond thereto using the correspondence relationship identified by the identification section 410 with respect to each of the plurality of points represented by the first area information, and then excluding the coordinate of the point which does not have the coordinate in the projector coordinate system made to correspond thereto from the first area information.

3. Third Embodiment

Figure 13:
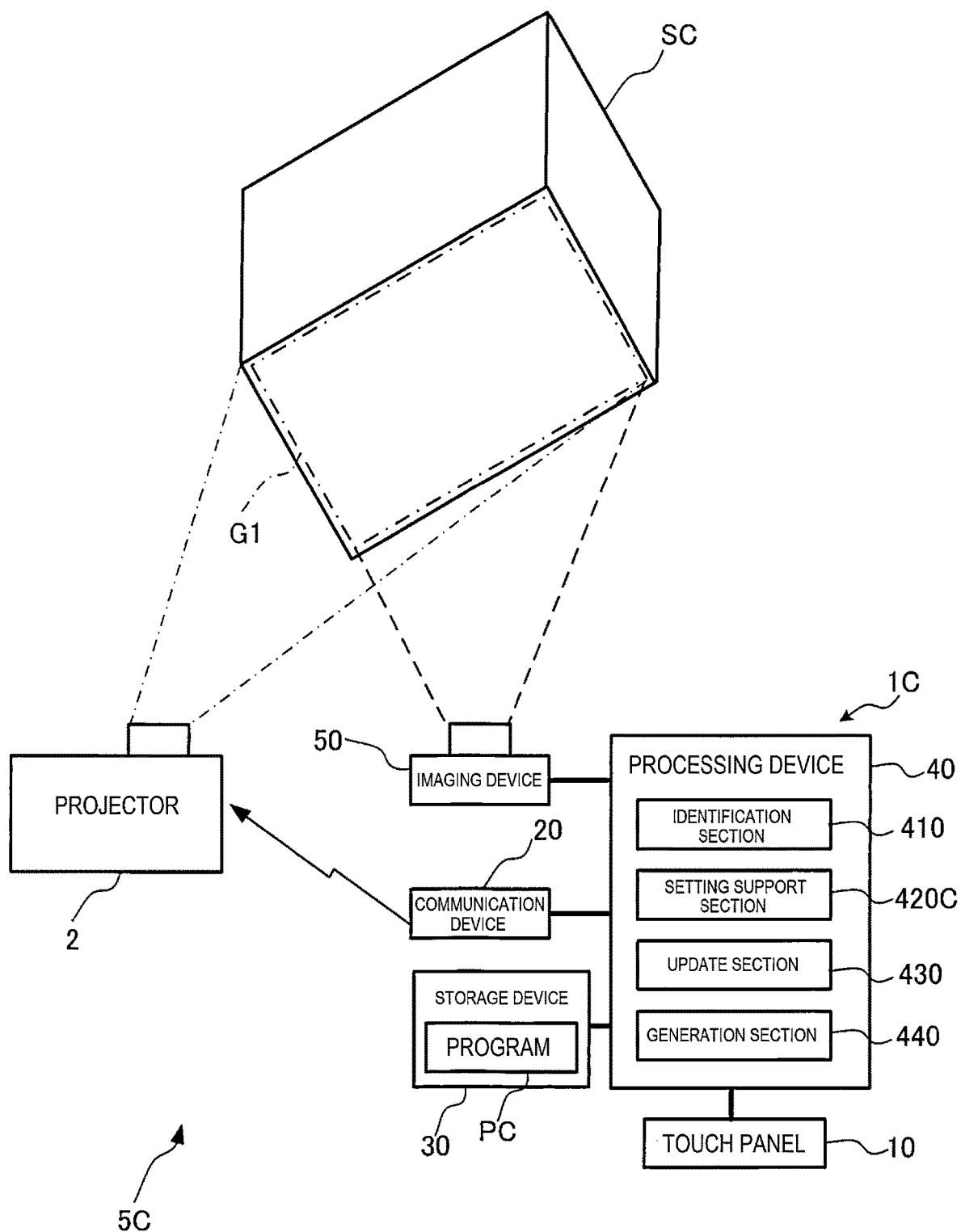
FIG. 13 is a block diagram showing a configuration example of an image display system including an information generation device for executing an information generation method according to a third embodiment of the present disclosure.

FIG. 13 is a block diagram showing a configuration example of an image display system. 5C including an information generation device 1C for executing an information generation method according to a third embodiment of the present disclosure. In FIG. 13, the same constituents as those shown in FIG. 1 are denoted by the same reference symbols. As is obvious when comparing FIG. 13 and FIG. 1 with each other, a difference of the image display system 5C from the image display system 5A is that the information generation device 1C is provided instead of the information generation device 1A. A difference of the information generation device 1C from the information generation device 1A is that a program PC is stored in the storage device 30 instead of the program PA. The program PC is the same as the program PA in the point that the processing device 40 is made to function as the identification section 410, the update section 430, and the generation section 440. The program PC is different from the program PA in the point that the processing device 40 is made to function as a setting support section 420C instead of the setting support section 420A.

The setting support section 420C makes the display device of the touch panel 10 display the setting support screen generated based on the taken image of the projection target SC by the imaging device 50 in order to prompt the user to execute the first operation. The setting support section 420C is the same in this point as the setting support section 420A. A difference of the setting support section 420C from the setting support section 420A is as follows.

The setting support section 420C estimates a first line based on the coordinates of the plurality of points obtained at regular time intervals along the trajectory drawn by the first operation. The first line which is estimated based on the coordinates of the plurality of points can be a straight line, or can also be a curved line. As a specific example of the straight line estimated based on the coordinates of the plurality of points, there can be cited a straight line obtained by the least-square method from the coordinates of the plurality of points. Further, as a specific example of the curved line estimated based on the coordinates of the plurality of points, there can be cited a curved line obtained by the Hough transformation from the coordinates of the plurality of points. The first line in the present embodiment is the straight line obtained by the least-square method from the coordinates of the plurality of points. Further, the setting support section 420C estimates a second line based on the coordinates of the plurality of points obtained by excluding the points used in the estimation of the first line from the coordinates obtained at the regular time intervals along the trajectory drawn by the first operation. The second line can also be a straight line, or can also be a curved line. The second line in the present embodiment is also the straight line obtained by the least-square method from the coordinates of the plurality of points. Further, the setting support section 420C corrects the outline drawn by the first operation so that a portion passing through the coordinates used for the estimation of the first line overlaps the first line, and corrects the outline drawn by the first operation so that a portion passing through the coordinates used for the estimation of the second line overlaps the second line.

Figure 14:
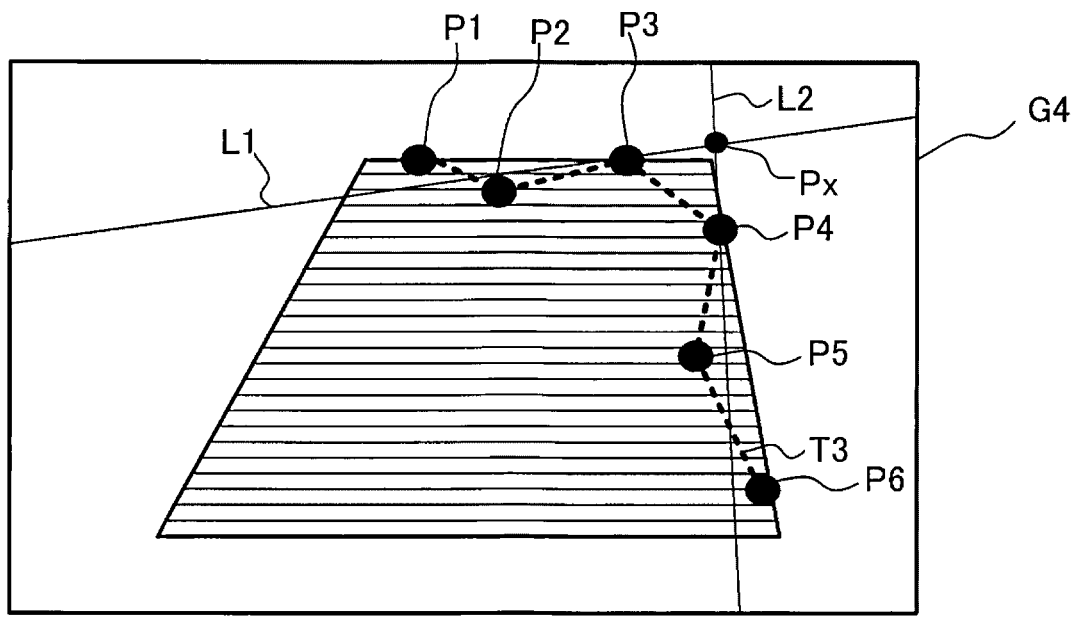
FIG. 14 is a diagram showing an example of the plurality of points represented by the first area information which is generated by a setting support section.

For example, it is assumed that the trajectory T3 is drawn by the first operation to the setting support screen G4, and the coordinates of the points P1 through P6 are obtained at regular time intervals in this order as the coordinates of the points on the trajectory T3 as shown in FIG. 14. It should be noted that in FIG. 14, a part of the trajectory T3 drawn by the first operation is drawn with dotted lines. The points P1, P2, and P3 should normally be arranged along a single straight line, but fail to be arranged along a single straight line due to a hand tremor or the like in drawing the trajectory T3 in the example shown in FIG. 14. Similarly, the points P4, P5, and P6 should normally be arranged along a single straight line, but fail to be arranged along a single straight line due to a hand tremor or the like in drawing the trajectory T3 in the example shown in FIG. 14.

Figure 15:
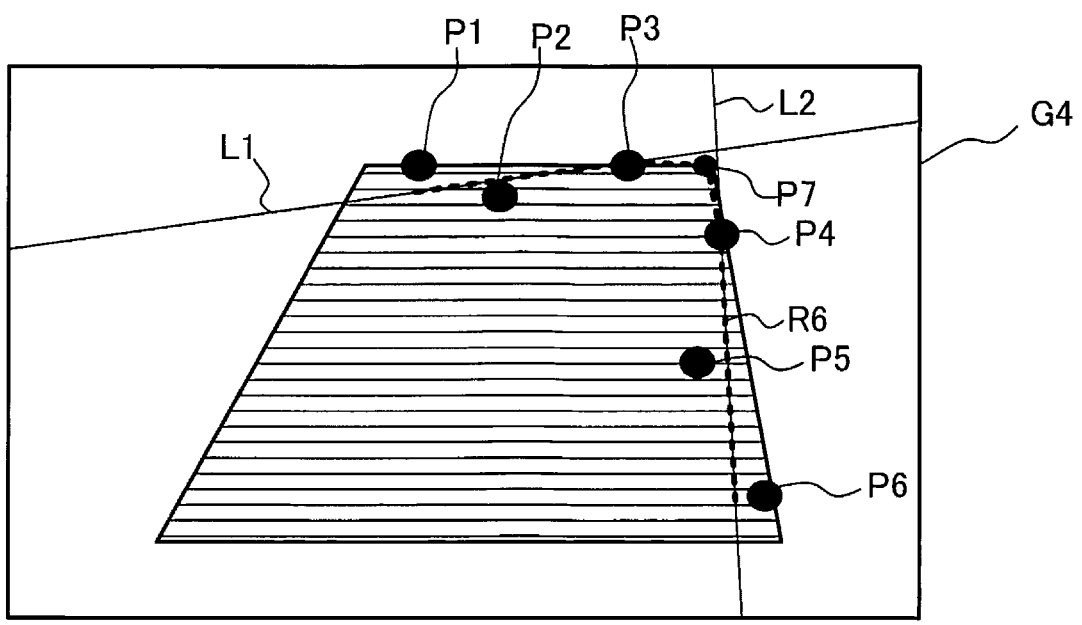
FIG. 15 is a diagram showing an example of the outline of the display area which has been corrected by the setting support section.

It is assumed that a straight line L1 is estimated by the least-square method based on the points P1 through P3 in FIG. 14, and a straight line L2 is estimated by the least-square method based on the points P4 through P6. The straight line L1 is an example of the first line, and the straight line L2 is an example of the second line. In this case, as shown in FIG. 15, the setting support section 420C corrects a portion passing through the points P1, P2, and P3 of the outline of the display area so as to overlap the straight line L1. Thus, a slur of the outline caused by the hand tremor in the portion passing through the points P1, P2, and P3 of the outline of the display area is corrected. Further, as shown in FIG. 15, the setting support section 420C corrects a portion passing through the points P4, P5, and P6 of the outline of the display area so as to overlap the straight line L2. Thus, a slur of the outline caused by the hand tremor in the portion passing through the points P4, P5, and P6 of the outline of the display area is corrected. Further, the setting support section 420C corrects the first area information in accordance with the outline having been corrected. Specifically, the setting support section 420C projects the points P1 through P6 on the outline having been corrected, and then updates the coordinates of the points P1 through P6 in the first area information with the coordinates of the points having been projected.

Further, when the first line and the second line cross each other, the setting support section 420C takes an intersection point of the first line and the second line as a vertex of the outline of the display area. It should be noted that when the intersection point does not have a coordinate in the projector coordinate system corresponding thereto, the setting support section 420C replaces the intersection point with a point the distance of which from the intersection point is shorter than a second threshold value, and which has a coordinate in the projector coordinate system corresponding thereto, and thus corrects the first area information. An area provided with horizontal-line hatching in FIG. 15 is an area in which the correspondence relationship with the projector coordinate system has already been identified by the identification section 410. In the example shown in FIG. 14, the intersection point Px of the first line L1 and the second line L2 is located outside the area provided with the horizontal-line hatching. In other words, the intersection point Px does not have the coordinate in the projector coordinate system corresponding thereto. Therefore, the setting support section 420C replaces the intersection point Px with a point P7 the distance of which from the intersection point Px is shorter than the second threshold value, and which has the coordinate in the projector coordinate system corresponding thereto, and thus, corrects the first area information. As a result, the portion corresponding to the points P1 through P3, the point P7, and the points P4 through P6 of the outline passing through the plurality of coordinates represented by the first area information becomes a line R6 shown in FIG. 15.

Figure 16:
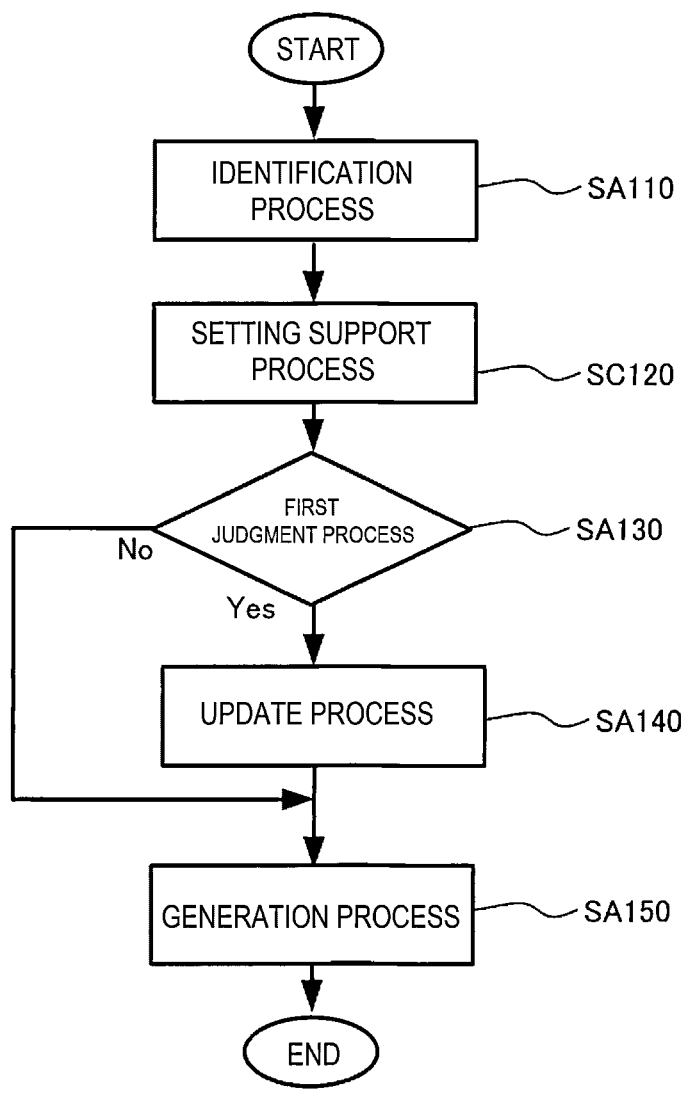
FIG. 16 is a flowchart showing a flow of an information generation method to be executed by the processing device of the information generation device in accordance with a program.

Further, the processing device 40 which is operating in accordance with the program PC executes the information generation method according to the present disclosure. FIG. 16 is a diagram showing a flow of the information generation method to be executed by the processing device 40 in accordance with the program PC. In FIG. 16, the same constituents as those shown in FIG. 8 are denoted by the same reference symbols. The information generation method according to the present embodiment is different from the information generation method according to the first embodiment in the point that a setting support process SC120 is provided instead of the setting support process SA120. In the setting support process SC120, the processing device 40 functions as the setting support section 420C.

In the setting support process SC120, the processing device 40 makes the display device of the touch panel 10 display the setting support screen generated based on the taken image of the projection target SC by the imaging device 50 in order to prompt the user to execute the first operation. The processing device 40 obtains the coordinates of the points on the trajectory drawn by the first operation at regular time intervals to generate the first area information.

Then, the processing device 40 estimates the first line based on the coordinates of the plurality of points obtained at regular time intervals along the trajectory drawn by the first operation. Further, the processing device 40 estimates the second line based on the coordinates of the plurality of points obtained by excluding the points used in the estimation of the first line from the coordinates obtained at the regular time intervals along the trajectory drawn by the first operation.

Then, the processing device 40 corrects the outline drawn by the first operation so that the portion passing through the coordinates used for the estimation of the first line overlaps the first line, and corrects the outline drawn by the first operation so that the portion passing through the coordinates used for the estimation of the second line overlaps the second line. When the first line and the second line cross each other, the processing device 40 takes the intersection point of the first line and the second line as the vertex of the outline of the display area. It should be noted that when the intersection point does not have a coordinate in the projector coordinate system corresponding thereto, the processing device 40 replaces the intersection point with the point the distance of which from the intersection point is shorter than the second threshold value, and which has a coordinate in the projector coordinate system corresponding thereto, and thus corrects the first area information.

According also to the information generation device 1C related to the present embodiment, there is no need to go to the installation place of the projection target SC every time the projection image is changed. Further, according also to the information generation device 1C related to the present embodiment, it becomes possible to designate the display area without any problem even when the projection target SC is installed in a high place beyond the reach of the user. As described above, according also to the information generation device 1C related to the present embodiment, it becomes possible to simply and easily set the display area without going to the installation place of the projection target SC every time the projection image is changed. In addition, according to the information generation device 1C according to the present embodiment, it becomes possible to set the display area which can surely be transformed into the projector coordinate system while reducing the slur of the outline caused by the hand tremor when manually drawing the outline of the display area.

4. Modified Examples

Each of the embodiments described above can be modified as follows.

(1) In each of the embodiments, the display area is designated by the operation of drawing the outline. However, it is possible to make the user designate the display area using a predetermined figure such as a variety of polygons or an ellipse. For example, when displaying a pull-down menu for selecting any of a predetermined plurality of types of figures, it is sufficient to designate the display area by an operation of selecting one of the figures displayed in the pull-down menu, and an operation of changing at least one of the position and the shape of the figure thus selected. Further, it is possible to identify the overall shape of the projection target SC or the shape of each of the surfaces of the projection target SC using edge detection or the like, and include the figure corresponding to the shape thus identified in the pull-down menu described above.

(2) The information generation device 1A according to the first embodiment is the smart phone having the imaging device 50, but can be a tablet terminal provided with an imaging device, or a personal computer of a notebook type or a stationary type provided with the imaging device. It should be noted that when using the personal computer of the notebook type or the stationary type as the information generation device according to the present disclosure, it is possible to receive the first operation for designating the display area using a mouse or a keyboard as the input device.

Further, when the information generation device can obtain the taken image using data communication via a network such as LAN, the information generation device is not required to be provided with the imaging device. Further, in a computer system having a portable terminal such as a smartphone or a tablet terminal and a server device communicating therewith via a LAN or the Internet, it is possible to make a processing device of the server device function as the identification section 410, the setting support section 420A, the update section 430, and the generation section 440, and make the portable terminal play a role of the display device and the input device. The computer system is an example of the information generation system according to the present disclosure. The same applies to the information generation device 1B according to the second embodiment and the information generation device 1C according to the third embodiment.

(3) The identification section 410, the setting support section 420A, the update section 430, and the generation section 440 in the first embodiment are each a software module. However, some or all of the identification section 410, the setting support section 420A, the update section 430, and the generation section 440 can be hardware. As an example of the hardware, there can be cited a DSP (Digital Signal Processor), an ASIC (Application Specific Integrated Circuit), a PLD (Programmable Logic Device), and an FPGA (Field Programmable Gate Array). Even when some or all of the identification section 410, the setting support section 420A, the update section 430, and the generation section 440 are hardware, the same advantages as those of the first embodiment are exerted. Some or all of the identification section 410, the setting support section 420B, the update section 430, and the generation section 440 in the second embodiment can similarly be hardware. Further, some or all of the identification section 410, the setting support section 420C, the update section 430, and the generation section 440 in the third embodiment can similarly be hardware.

(4) The information generation device 1A according to the first embodiment has the identification section 410, the setting support section 420A, the update section 430, and the generation section 440. However, the update section 430 can be omitted, and the first judgment process SA130 and the update process SA140 in the information generation method shown in FIG. 8 can also be omitted. This is because when omitting the update section 430, the first judgment process SA130, and the update process SA140, there is no need to go to the installation place of the projection target SC every time the display area is set, and it is possible to designate the display area without any problem even when the projection target SC is installed in a high place beyond the reach of the user. Regarding the information generation device 1B according to the second embodiment and the information generation device 1C according to the third embodiment, the update section 430 can similarly be omitted, and the first judgment process SA130 and the update process SA140 can similarly be omitted.

(5) In the first embodiment, the program PA has already been stored in the storage device 30. However, it is possible to manufacture or distribute the program PA alone. As a specific method of distributing the program PA, there can be cited an aspect of writing the program PA described above in a computer-readable recording medium such as a flash ROM (Read Only Memory) to distribute the recording medium, and an aspect of distributing the program PA by downloading the program PA via a telecommunication line such as the Internet. By installing the program PA in a general information processing device such as a personal computer, and then operating a computer such as a CPU in the information processing device in accordance with the program, it becomes possible to make the information processing device function as the information generation device according to the present disclosure. The same applies to the program PB according to the second embodiment and the program PC according to the third embodiment.

5. Aspects Figured Out from at Least One of Embodiments and Modified Examples

The present disclosure is not limited to the embodiments and the modified examples described above, but can be implemented in a variety of aspects within the scope or the spirit of the present disclosure. For example, the present disclosure can also be implemented in the following aspects. The technical features in the embodiments described above corresponding to the technical features in each of the aspects described below can properly be replaced or combined in order to solve a part or the whole of the problem of the present disclosure, or to achieve some or all of the advantages of the present disclosure. Further, the technical feature can properly be eliminated unless described in the present specification as an essential element.

In order to solve the problems described hereinabove, an aspect of the information generation method according to the present disclosure includes the identification process SA110, the setting support process SA120, and the generation process SA150. In the identification process SA110, the correspondence relationship between the projector coordinate system and the camera coordinate system is identified based on the image of the measurement pattern projected on the projection target SC from the projector 2, and the taken image obtained by imaging the projection target SC in the state in which the image of the measurement pattern is projected thereon using the imaging device 50. The projector coordinate system means a coordinate system representing a position on the projection image projected by the projector 2. The camera coordinate system means a coordinate system representing a position on the taken image taken by the imaging device 50. The image of the measurement pattern is an example of the first image in the present disclosure. The taken image by the imaging device 50 is an example of the second image in the present disclosure. The imaging device

50 is an example of the camera in the present disclosure. In the setting support process SA120, the display device of the touch panel 10 is made to display the taken image of the projection target SC by the imaging device 50. Thus, the user is prompted to execute the first operation of designating the display area to be the arrangement destination in the camera coordinate system of the projection object to be projected on the projection target SC from the projector 2. In the generation process SA150, the information for making the projector project the projection image in which the projection object is disposed in the display area designated by the first operation is generated based on the information representing the display area designated by the first operation and the correspondence relationship. According to the information generation method related to the present aspect, it becomes possible to designate the display area without any problem even when the projection target SC is installed in a high place beyond the reach of the user. Further, according to the information generation method related to the present aspect, it becomes possible to set the display area without going to the installation place of the projection target SC every time the projection image is changed.

In the information generation method according to a more preferable aspect, the information representing the display area is the information representing a plurality of points on the outline of the display area. The first operation is an operation of drawing the outline of the display area on the taken image currently displayed by the display device. In the setting support process SA120, the coordinates of the points on the trajectory drawn by the first operation is obtained at regular time intervals, and the coordinates thus obtained are taken as the coordinates of the points on the outline of the display area. According to the present aspect, it becomes possible to designate the display area by the operation of drawing the outline of the display area.

In the information generation method according to a further more preferable aspect, the first operation is an operation of drawing the outline of the display area by a swipe to the touch panel including the display device. According to the present aspect, it becomes possible to designate the display area with a swipe operation.

In the setting support process SA120 in the information generation method according to another preferable aspect, the coordinate which does not have a coordinate in the projector coordinate system made to correspond thereto using the correspondence relationship identified in the identification process SA110 out of the coordinates thus obtained is excluded from the plurality of coordinates which represents one-to-one the plurality of points on the outline drawn by the first operation. According to the present aspect, it becomes possible to set the display area which can surely be transformed into the projector coordinate system.

The information generation method according to another preferable aspect can include the setting support process SB120 instead of the setting support process SA120. In the setting support process SB120, there is obtained the outline information representing the outline of the projection target SC in the camera coordinate system. In the setting support process SB120, whether or not the distance from the outline represented by the outline information is not shorter than the first threshold value is judged with respect to each of the coordinates obtained. Then, the coordinate the judgment result of which is affirmative is excluded from the plurality of coordinates representing one-to-one the plurality of points on the outline drawn by the first operation. According to the present aspect, it becomes possible to set the display area approximating the outline of the projection target.

In the information generation method according to another preferable aspect, it is possible to include the setting support process SC120 instead of the setting support process SA120. In the setting support process SC120, the first line is estimated based on the plurality of coordinates obtained at regular time intervals along the trajectory drawn by the first operation. Further, in the setting support process SC120, the second line is estimated based on the plurality of coordinates obtained at regular time intervals along the trajectory drawn by the first operation except the coordinates used for the estimation of the first line. In the setting support process SC120, the outline drawn by the first operation is corrected so that the portion passing through the coordinates used for the estimation of the first line overlaps the first line, and so that the portion passing through the coordinates used for the estimation of the second line overlaps the second line. According to the present embodiment, it becomes possible to reduce the slur of the outline caused by the hand tremor or the like in manually drawing the outline.

In the information generation method according to another preferable aspect, in the setting support process SC120, when the first line and the second line cross each other, the intersection point of the first line and the second line is taken as the vertex of the display area designated by the first operation. According to the present embodiment, it becomes possible to newly set the vertex of the display area while reducing the slur of the outline caused by the hand tremor or the like in manually drawing the outline.

In the information generation method according to a more preferable aspect, when there is no coordinate in the projector coordinate system corresponding to the intersection point of the first line and the second line, by replacing the vertex set in accordance with the intersection point of the first line and the second line with the point the distance of which from the vertex is shorter than the second threshold value, and which has the coordinate in the projector coordinate system corresponding thereto, the information representing the display area is corrected. According to the present aspect, it becomes possible to set the display area which can surely be transformed into the projector coordinate system while reducing the slur of the outline caused by the hand tremor or the like.

In the information generation method according to another preferable aspect, it is possible to further include the update process SA140 for updating the information representing the display area in accordance with the second operation when the second operation of designating the point on the outline of the display area, and then moving the point thus designated has been performed by the user. According to the present aspect, it becomes possible to set the display area having complicated shapes.

In order to solve the problems described hereinabove, the information generation system according to the present disclosure includes the input device, the display device, and the processing device 40. The processing device 40 can execute the identification process SA110, the setting support process SA120, and the generation process SA150 described above. Further, the processing device 40 can execute the identification process SA110, the setting support process SB120, and the generation process SA150 described above. Further, the processing device 40 can execute the identification process SA110, the setting support process SC120, and the generation process SA150 described above. According also to the information generation systems related to these aspects, it becomes possible to designate the display area without any problem even when the projection target SC is installed in a high place beyond the reach of the user.

Further, it becomes also possible to set the display area without going to the place where the projection target SC is installed every time the projection image is changed.

In order to solve the problems described hereinabove, a non-transitory computer-readable storage medium storing a program according to the present disclosure can make a computer execute the identification process SA110, the setting support process SA120, and the generation process SA150 described above. Further, it is possible for the non-transitory computer-readable storage medium storing the program according to the present disclosure to make the computer execute the identification process SA110, the setting support process SB120, and the generation process SA150 described above. Further, it is possible to make the computer execute the identification process SA110, the setting support process SC120, and the generation process SA150 described above. According also to the non-transitory computer-readable storage medium storing the program related to these aspects, it becomes possible to designate the display area without any problem even when the projection target SC is installed in a high place beyond the reach of the user. Further, it becomes also possible to set the display area without going to the place where the projection target SC is installed every time the projection image is changed.

What is claimed is:

1. An information generation method comprising:
identifying a correspondence relationship between a projector coordinate system representing a position on a projection image projected by a projector and a camera coordinate system representing a position on a taken image taken by a camera, the correspondence relationship identified based on a first image and a second image, the first image projected on a projection target from the projector, and the second image obtained by imaging the projection target using the camera in a state in which the first image is projected on the projection target;
displaying, by a display device, the taken image of the projection target which is taken by the camera;
receiving a first operation which designates a display area in the camera coordinate system; and
generating information for making the projector project the projection image in which a projection object is disposed in the display area designated by the first operation based on the correspondence relationship and information representing the display area designated by the first operation, wherein
the information representing the display area is information representing a plurality of points on an outline of the display area, and
the first operation is an operation of drawing the outline on the taken image displayed by the display device, coordinates on a trajectory drawn by the first operation are obtained at regular time intervals, and the coordinates obtained are taken as points on the outline.

2. The information generation method according to claim 1, wherein
the first operation is an operation of drawing the outline using a swipe to a touch panel including the display device.

3. The information generation method according to claim 1, wherein
a coordinate which does not have a coordinate in the projector coordinate system made to correspond to the coordinate using the correspondence relationship out of the coordinates obtained is excluded from a plurality of coordinates representing one-to-one the plurality of points on the outline drawn by the first operation.

4. The information generation method according to claim 1, further comprising:
obtaining outline information representing an outline of the projection target in the camera coordinate system; and
excluding the coordinate from the plurality of coordinates representing one-to-one the plurality of points on the outline drawn by the first operation in a case a distance between the coordinate and the outline represented by the outline information is equal to or longer than a first threshold value.

5. The information generation method according to claim 1, further comprising:
estimating a first line based on the plurality of coordinates obtained at the regular time intervals along the trajectory;
estimating a second line based on the plurality of coordinates obtained at the regular time intervals along the trajectory except the coordinates used for the estimation of the first line;
correcting the outline drawn by the first operation so that a portion passing through the coordinates used for the estimation of the first line overlaps the first line; and
correcting the outline drawn by the first operation so that a portion passing through the coordinates used for the estimation of the second line overlaps the second line.

6. The information generation method according to claim 5, further comprising:
taking an intersection point of the first line and the second line as a vertex of the outline of the display area.

7. The information generation method according to claim 5, wherein
when there is no coordinate in the projector coordinate system corresponding to the vertex, the vertex is replaced with a point a distance of which from the vertex is shorter than a second threshold value, and which has a coordinate in the projector coordinate system corresponding to the point, to correct the information representing the display area.

8. The information generation method according to claim 1, wherein
when a second operation of designating a point on the outline of the display area and moving the point designated is performed by a user, the information representing the display area is updated in accordance with the second operation.

9. An information generation system comprising:
an input device;
a display device; and
at least one processor which executes
identifying a correspondence relationship between a projector coordinate system representing a position on a projection image projected by a projector and a camera coordinate system representing a position on a taken image taken by a camera, the correspondence relationship identified based on a first image and a second image, the first image projected on a projection target from the projector, and the second image obtained by imaging the projection target using the camera in a state in which the first image is projected on the projection target,
making the display device display the taken image of the projection target which is taken by the camera, receiving input of a first operation to the input device, the first operation designating a display area in the camera coordinate system, and generating information for making the projector project the projection image in which a projection object is disposed in the display area designated by the first operation based on the correspondence relationship and information representing the display area designated by the first operation, wherein the information representing the display area is information representing a plurality of points on an outline of the display area, and the first operation is an operation of drawing the outline on the taken image displayed by the display device, coordinates on a trajectory drawn by the first operation are obtained at regular time intervals, and the coordinates obtained are taken as points on the outline.

10. A non-transitory computer-readable storage medium storing a program for making a computer execute a method comprising:

identifying a correspondence relationship between a projector coordinate system representing a position on a projection image projected by a projector and a camera coordinate system representing a position on a taken image taken by a camera, the correspondence relationship identified based on a first image and a second image, the first image projected on a projection target from the projector, and the second image obtained by imaging the projection target using the camera in a state in which the first image is projected on the projection target;

making a display device display the taken image of the projection target which is taken by the camera;

receiving a first operation which designates a display area in the camera coordinate system; and generating information for making the projector project the projection image in which a projection object is disposed in the display area designated by the first operation based on the correspondence relationship and information representing the display area designated by the first operation, wherein the information representing the display area is information representing a plurality of points on an outline of the display area, and the first operation is an operation of drawing the outline on the taken image displayed by the display device, coordinates on a trajectory drawn by the first operation are obtained at regular time intervals, and the coordinates obtained are taken as points on the outline.

* * * * *